United States Patent [19]

Yokoyama

[11] Patent Number: 5,768,669
[45] Date of Patent: Jun. 16, 1998

[54] DEVELOPING DEVICE HAVING MAGNET ROLL FIXED BY WELDING AND METHOD OF ASSEMBLING THE SAME

[75] Inventor: Katsunori Yokoyama, Susono, Japan

[73] Assignee: Canon Kabushiki Kaisha, Japan

[21] Appl. No.: 801,818

[22] Filed: Feb. 14, 1997

[30] Foreign Application Priority Data

Feb. 16, 1996 [JP] Japan .................... 8-029270

[51] Int. Cl.$^6$ .................... G03G 15/00
[52] U.S. Cl. .................... 399/282; 156/73.1; 399/111; 399/277
[58] Field of Search .................... 399/277, 282, 399/265, 107, 111; 156/73.1, 308.2, 580.1; 264/402, 442, 445

[56] References Cited

U.S. PATENT DOCUMENTS

| | | |
|---|---|---|
| 3,367,809 | 2/1968 | Soloff .................... 156/73.1 |
| 4,557,582 | 12/1985 | Kan et al. .................... 399/277 X |
| 4,865,680 | 9/1989 | Pierson .................... 156/73.1 X |
| 4,872,418 | 10/1989 | Yoshikawa et al. .................... 399/277 |
| 5,550,617 | 8/1996 | Odagawa et al. .................... 399/111 X |
| 5,579,085 | 11/1996 | Miyabe et al. .................... 399/111 |

*Primary Examiner*—Arthur T. Grimley
*Assistant Examiner*—Sophia S. Chen
*Attorney, Agent, or Firm*—Fitzpatrick, Cella, Harper & Scinto

[57] ABSTRACT

In a developing unit used for an image forming apparatus to develop an electrostatic latent image on an image carrier, there are provided a developing agent carrying member for carrying a developing agent, a magnet roll disposed in the developing agent carrying member and a supporting member for supporting the magnet roll. A portion of the supporting member is melted so that a central shaft of the magnet roll is welded to the supporting member to attain fixation between the magnet roll and the supporting member.

11 Claims, 9 Drawing Sheets

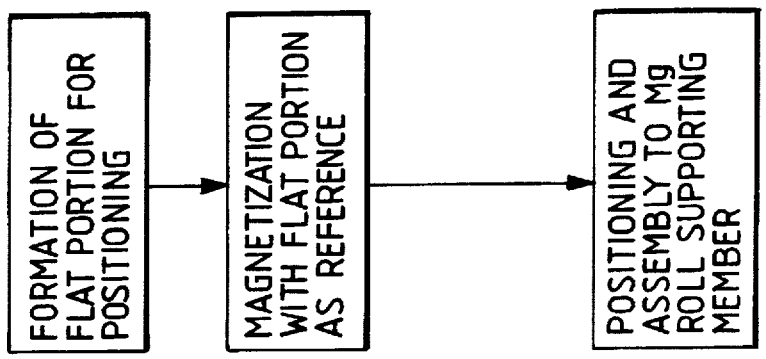
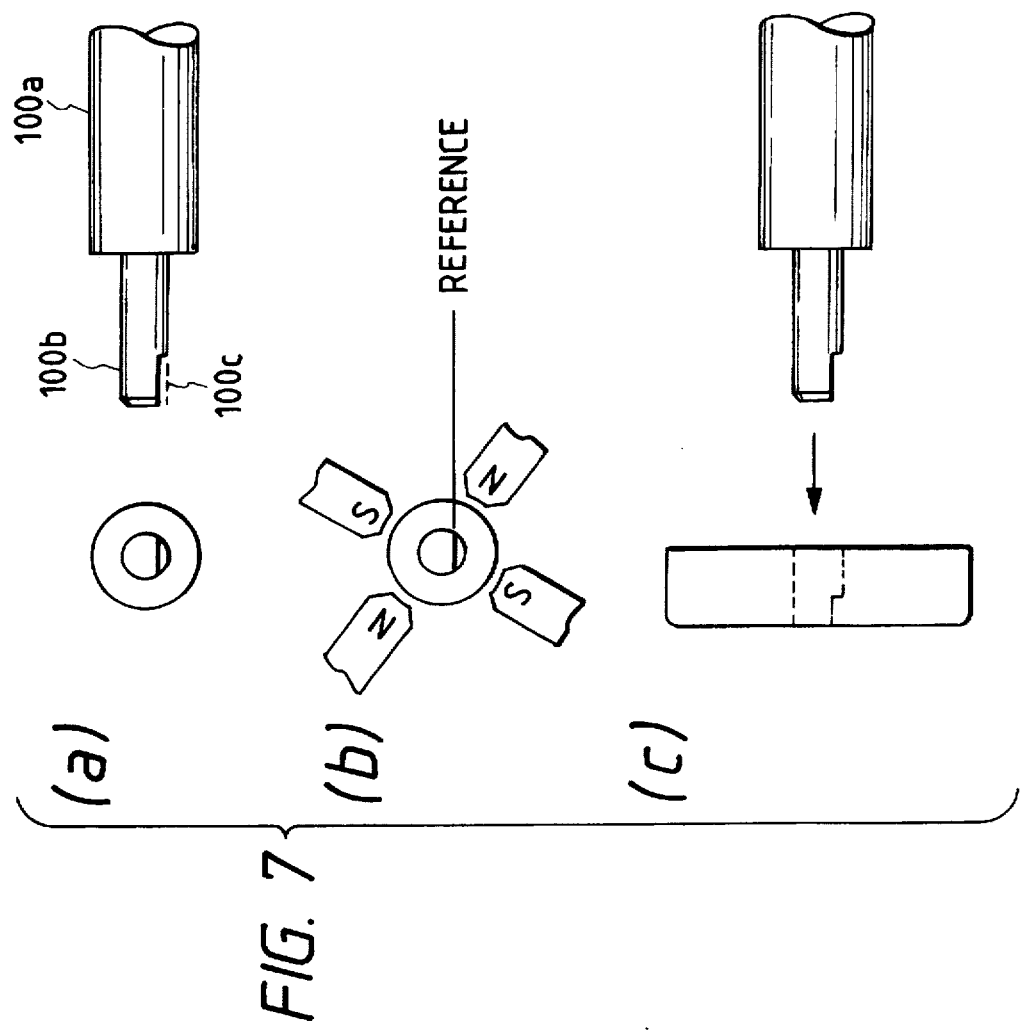
FIG. 7

5,768,669

DEVELOPING DEVICE HAVING MAGNET ROLL FIXED BY WELDING AND METHOD OF ASSEMBLING THE SAME

BACKGROUND OF THE INVENTION

1. Field of the Invention

The present invention relates to a developing device used for an image forming apparatus such as a copying machine or a printer to develop an electrostatic latent image on an image carrier, and a method of assembling the same.

2. Related Background Art

An electrostatic latent image on an image carrier such as a photosensitive body is developed in an image forming apparatus of an electrophotographic or electrostatic recording scheme.

A developing device for developing an electrostatic latent image has a developing sleeve in which a magnet roll is disposed.

This magnet roll requires high-precision positioning adjustment in assembly.

A magnet roll member is a functional member for forming a static magnetic field between the developing sleeve and the developing unit housing. The phases of magnetic poles of the magnet roll member itself must be highly accurately positioned with respect to the developing unit housing. As a conventional phase maintaining method, there has been employed a positioning method of forming corrugations on the magnet roll member and a magnet roll supporting member to fit or engage them with each other, thereby positioning the magnet roll member.

According to the conventional positioning method, however, the assembled developing unit cannot meet the final precision requirement for recent high image quality due to the limitations in shape error management of each component and the cumulative error in assembly.

There is proposed a method of sensing the magnetic pole positions of a magnet roll member in assembly in order to accurately position the magnet roll member and adjusting the sensed magnetic pole positions with respect to a developing unit.

According to this conventional positioning method, however, the magnet roll member is fixed to the magnet roll supporting member using a fixing collar or a set screw. Thus, the screw loosens due to shifting and vibrations in fixing, thus resulting in poor reliability.

SUMMARY OF THE INVENTION

It is an object of the present invention to provide a developing device in which a magnet roll has a high positional precision, and a method of manufacturing the developing device.

It is another object of the present invention to provide a developing device having a magnet roll fixed by welding, and a method of manufacturing the developing device.

The above and other objects, features, and advantages of the present invention will be apparent from the following detailed description in conjunction with the accompanying drawings.

BRIEF DESCRIPTION OF THE DRAWINGS

FIG. 7 is a view showing a magnet roller manufacturing process;

DESCRIPTION OF THE PREFERRED EMBODIMENTS

The preferred embodiments of the present invention will be described with reference to the accompanying drawings.

[General Description of Process Cartridge and Image Forming Apparatus Mounted with Process Cartridge]

Figure 1:
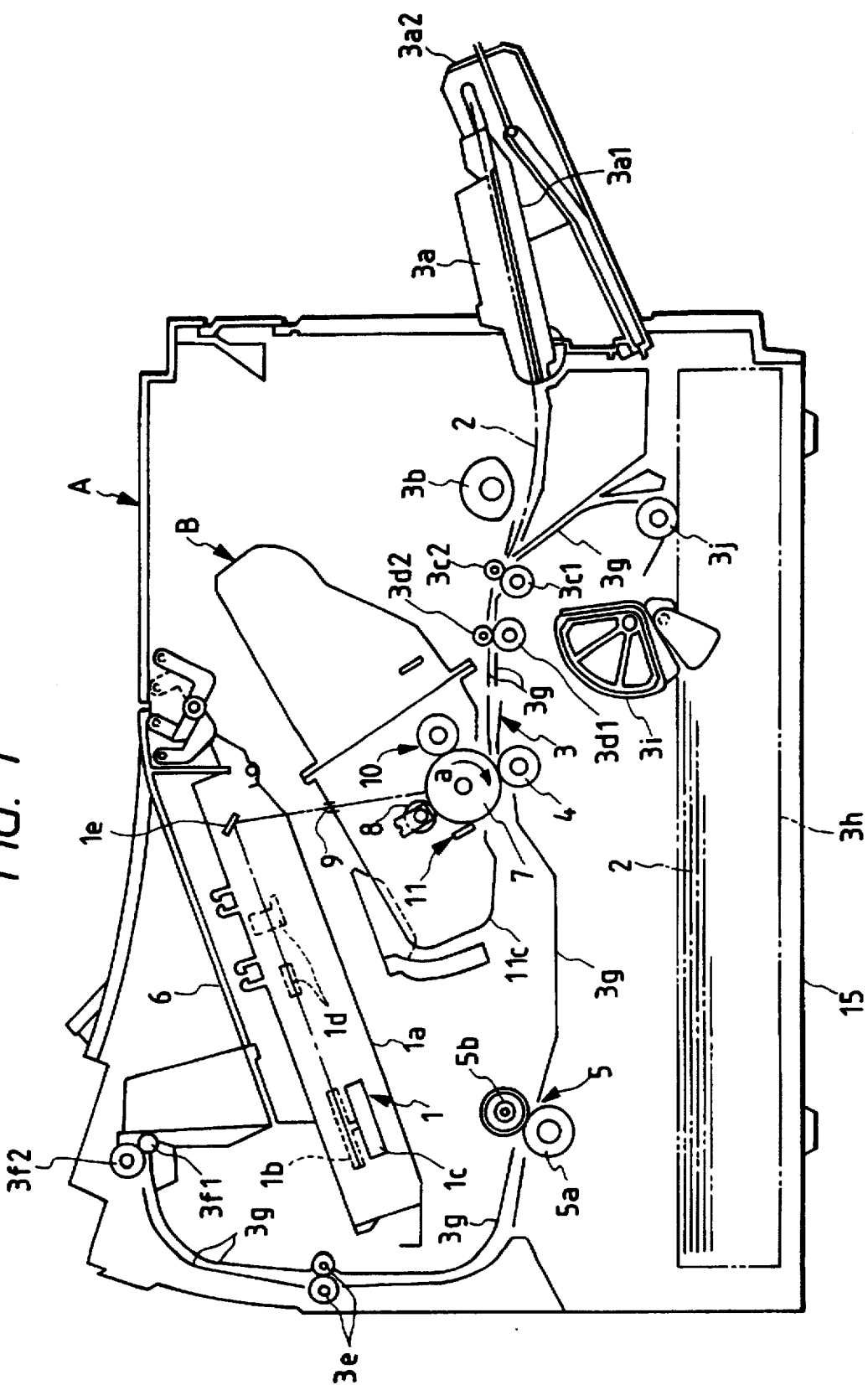
FIG. 1 is a sectional view showing the structure of an image forming apparatus according to the present invention.
Figure 2:
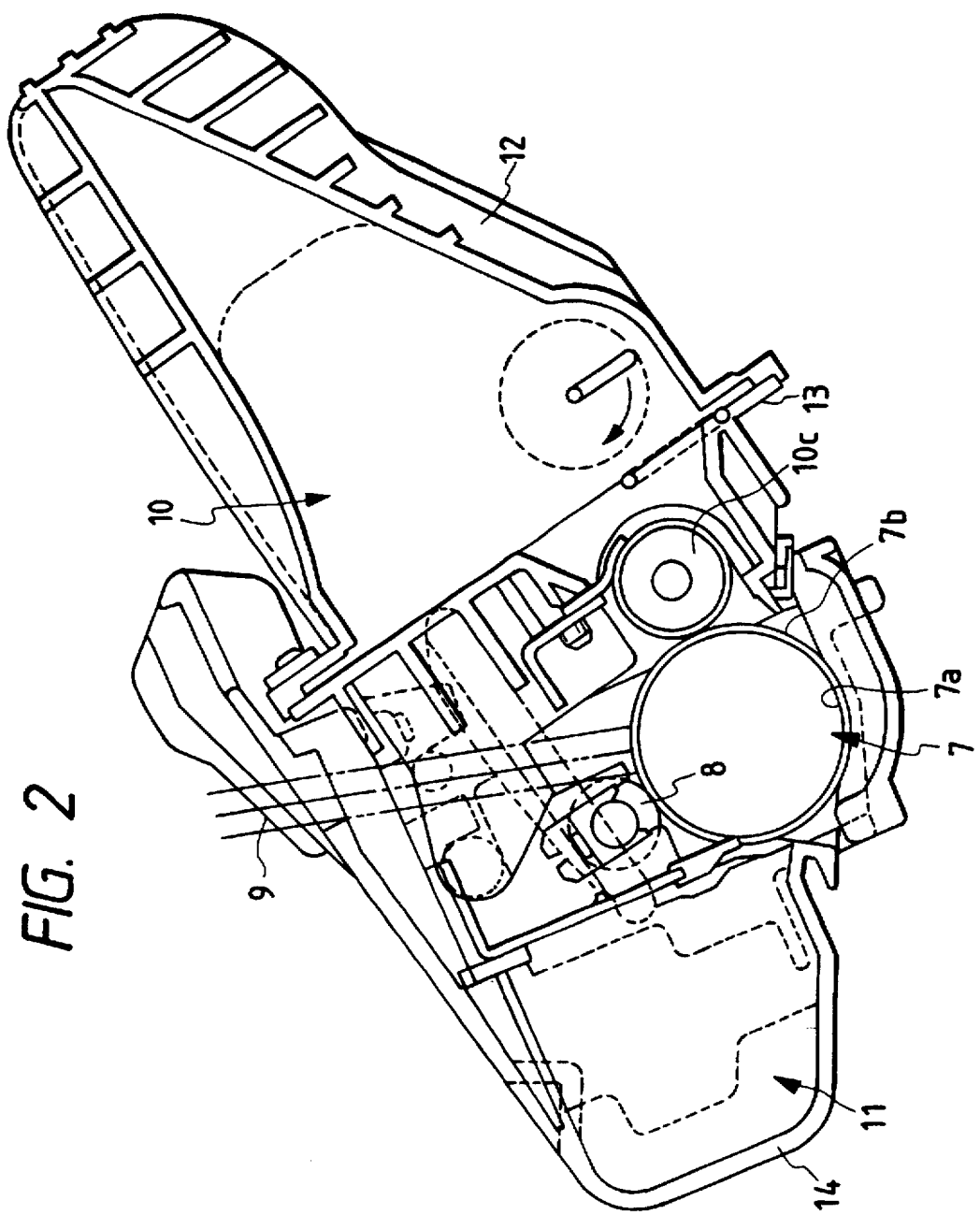
FIG. 2 is a sectional view showing the structure of a process cartridge in FIG. 1.
Figure 3:
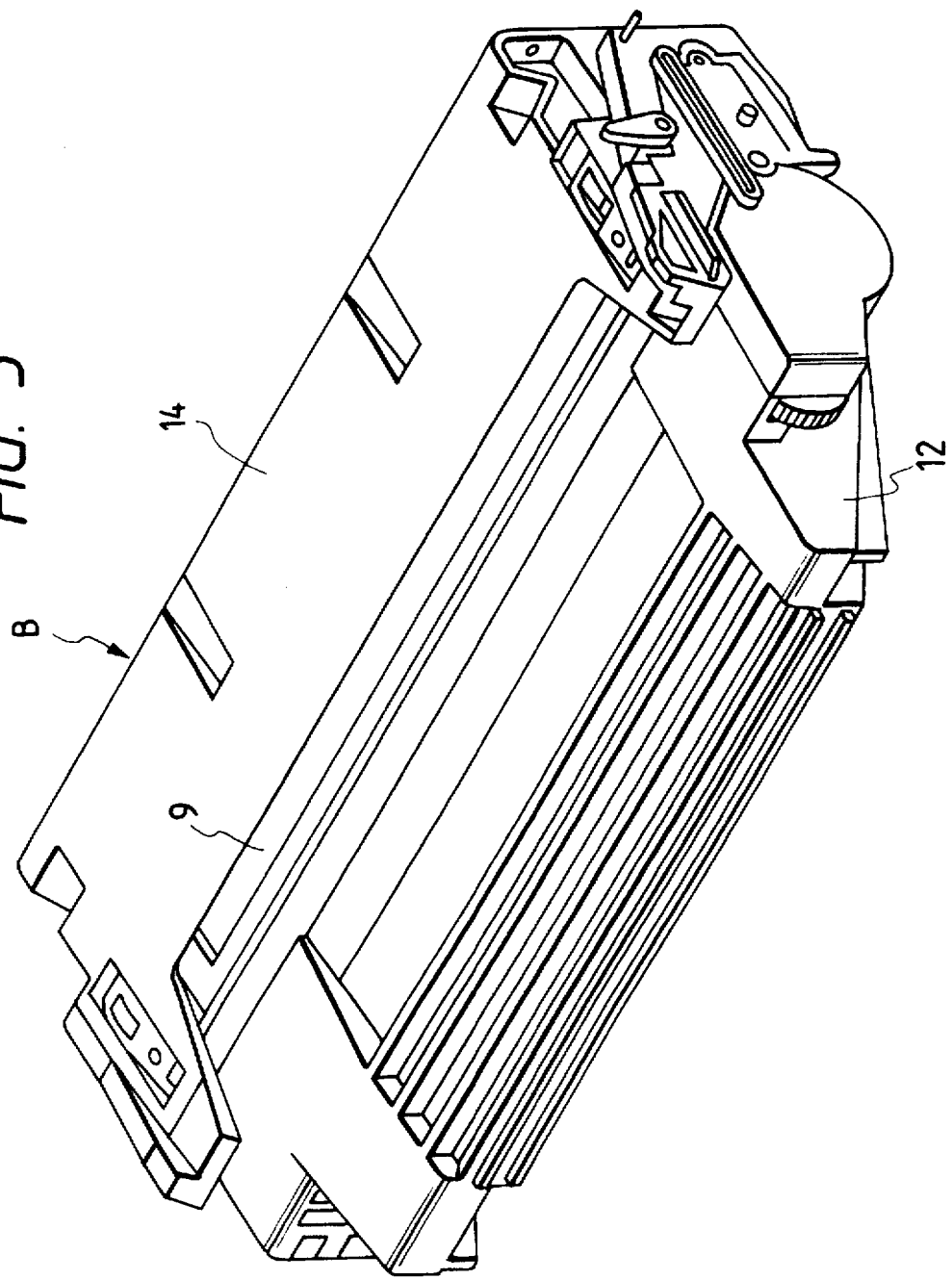
FIG. 3 is a perspective view showing the outer appearance of the process cartridge in FIG. 1.

The overall structure of the image forming apparatus will be described first. FIG. 1 is a sectional view for explaining the structure of a laser printer mounted with a process cartridge having a developing unit. FIG. 2 is a sectional view of the process cartridge, and FIG. 3 is a perspective view showing the outer appearance of the process cartridge.

As shown in FIG. 1, an image forming apparatus A forms a developing agent (to be referred to as toner hereinafter) image on a photosensitive drum 7 serving as an image carrier upon irradiating an optical image based on image information from an optical system 1. A recording medium 2 is conveyed by a convey means 3 in synchronism with the formation of the toner image. At an image forming portion as a process cartridge B, the toner image formed on the photosensitive drum is transferred to the recording medium 2 by a transfer means 4. The recording medium is transported to a fixing means 5. The transferred toner image is fixed, and the recording medium 2 is discharged to a discharge portion 6.

As shown in FIG. 2, the process cartridge B constituting the image forming portion is arranged as follows. The photosensitive drum 7 serving as an image carrier is rotated to cause a charging means 8 to uniformly charge the surface of the photosensitive drum 7. The photosensitive drum 7 is exposed to the optical image from the optical system 1 through an exposure unit 9 to form a latent image. A toner image corresponding to the latent image is formed by a developing means 10, thereby visualizing the latent image. The toner image is transferred to the recording medium 2 by the transfer means 4. The toner left on the photosensitive drum 7 is removed by a cleaning means 11.

Note that the process cartridge B is constituted by a toner frame 12 serving as the first frame having a toner reservoir, a developing frame 13 serving as the second frame having a developing sleeve and the like, and a cleaning frame 14 serving as the third frame having the photosensitive drum 7 and the cleaning means 11.

The structures of the respective components of the image forming apparatus A and the process cartridge B mounted therein will be described below in detail.

[Image Forming Apparatus]

The structures of the respective components of the image forming apparatus A will be described below.

(Optical System)

The optical system 1 performs light irradiation based on image information read from an external device or the like to form an optical image on the photosensitive drum 7. As shown in FIG. 1, a laser diode (not shown), a polygon mirror $1b$, a scanner motor $1c$, an imaging lens $1d$, and a reflection mirror $1e$ are accommodated in an optical unit 12 of an apparatus main body 15.

When an image signal is supplied from the external device or the like, the laser diode emits light in accordance with the image signal. A laser beam is irradiated on the polygon mirror $1b$ as the image light. The polygon mirror $1b$ is rotated by the scanner motor $1c$ at a high speed. The image light reflected by the polygon mirror $1b$ is irradiated on the photosensitive drum 7 through the imaging lens $1d$ and the reflection mirror $1e$ to selectively expose the surface of the photosensitive drum 7.

(Recording Medium Convey Means)

The structure of the convey means 3 for conveying the recording medium 2 will be described below. The recording medium 2 of this embodiment can be fed by manual paper feed or cassette paper feed. The manual paper feed structure is shown in FIG. 1. That is, when the recording medium 2 is set on a paper feed tray $3a$ to start image formation, the recording medium 2 on the paper feed tray $3a$ is fed into the apparatus by pickup rollers $3b$. At the same time, the recording media 2 are fed one by one by a pair of separation rollers $3c1$ and $3c2$. The recording medium 2 is then conveyed such that the leading end of the recording medium 2 abuts against a pair of register rollers $3d1$ and $3d2$. The pair of register rollers $3d1$ and $3d2$ are rotated in synchronism with image formation and convey the recording medium 2 to the image forming portion. Upon forming an image, the recording medium 2 is conveyed to the fixing means. After fixing the image, the recording medium 2 is discharged to the discharge portion 6 by an intermediate discharge roller $3e$ and a pair of discharge rollers $3f1$ and $3f2$. Note that guide members $3g$ for guiding the recording medium 2 are disposed between the respective rollers.

The paper feed tray $3a$ comprises an inner member $3a1$ and an outer member $3a2$. When the apparatus is not used, the inner member $3a1$ is accommodated in the outer member $3a2$, so that the outer member $3a1$ constitutes the outer portion of the apparatus main body 15.

On the other hand, a cassette feed structure is shown in FIG. 1 as follows. A loading portion for a cassette $3h$ is formed in the bottom portion of the apparatus main body 15. When the recording medium 2 is not manually fed, the recording media 2 stored in the cassette $3h$ loaded in the loading portion are fed one by one from the uppermost recording medium by pickup rollers $3i$ and a paper feed roller $3j$. The uppermost recording medium 2 is then fed to the pair of register rollers $3d1$ and $3d2$. The recording medium 2 is conveyed by the same members as in manual feed after the pair of register rollers $3d1$ and $3d2$.

(Transfer Means)

The transfer means 4 transfers to the recording medium 2 the toner image formed on the photosensitive drum 7 in the image forming portion. As shown in FIG. 1, the transfer means 4 of this embodiment is constituted by a transfer roller 4. More specifically, the recording medium 2 is urged by the transfer roller 4 against the photosensitive drum 7 of the mounted process cartridge B. A voltage having a polarity opposite to that of the toner image formed on the photosensitive drum 7 is applied to the transfer roller 4 to transfer the toner from the photosensitive drum 7 to the recording medium 2.

(Fixing Means)

The fixing means 5 fixes the toner image transferred to the recording medium 2 by applying the voltage to the transfer roller 4. As shown in FIG. 1, the fixing means 5 comprises a driving roller $5a$ which can rotate, and a driven fixing roller $5b$ having a heating member therein and pressed against the driving roller $5a$ to rotate therewith. When the recording medium 2 on which the toner image is formed in the image forming portion is passed between the driving roller $5a$ and the fixing roller $5b$, a pressure acts on the recording medium by the rollers $5a$ and $5b$, and heat is applied to the recording medium by the fixing roller $5b$, thereby fixing the toner transferred to the recording medium 2.

[Process Cartridge]

The structures of the respective components of the process cartridge B mounted in the image forming apparatus A will be described below.

The process cartridge B comprises an image carrier and at least one process means. The process means includes a charging means for charting the surface of the image carrier, a developing means for forming a toner image on the image carrier, a cleaning means for cleaning the toner left on the surface of the image carrier, and the like. As shown in FIGS. 2 and 3, the process cartridge B of this embodiment is arranged as follows. The charging means 8, the exposure unit 9, the developing means 10 for developing a latent image using toner, and the cleaning means 11 are arranged around the electrophotographic photosensitive drum 7 serving as an image carrier. These components are covered with a housing constituted by the toner frame 12, the developing frame 13, and the cleaning frame 14 to obtain an integral body. This integral body can be detachably mounted in the apparatus main body 15.

(Photosensitive Drum)

The photosensitive drum 7 of this embodiment is formed such that an organic photosensitive layer $7b$ is formed on the outer surface of a cylindrical aluminum drum base $7a$. As shown in FIG. 2, the photosensitive drum 7 is rotatably mounted in the cleaning frame 14. The driving force of a driving motor (not shown) is transmitted to a flange gear fixed to one end portion of the photosensitive drum 7 in the longitudinal direction. Therefore, the photosensitive drum 7 is rotated in a direction indicated by an arrow (a) in FIG. 1 in accordance with image formation.

(Developing Sleeve Unit)

Figure 4:
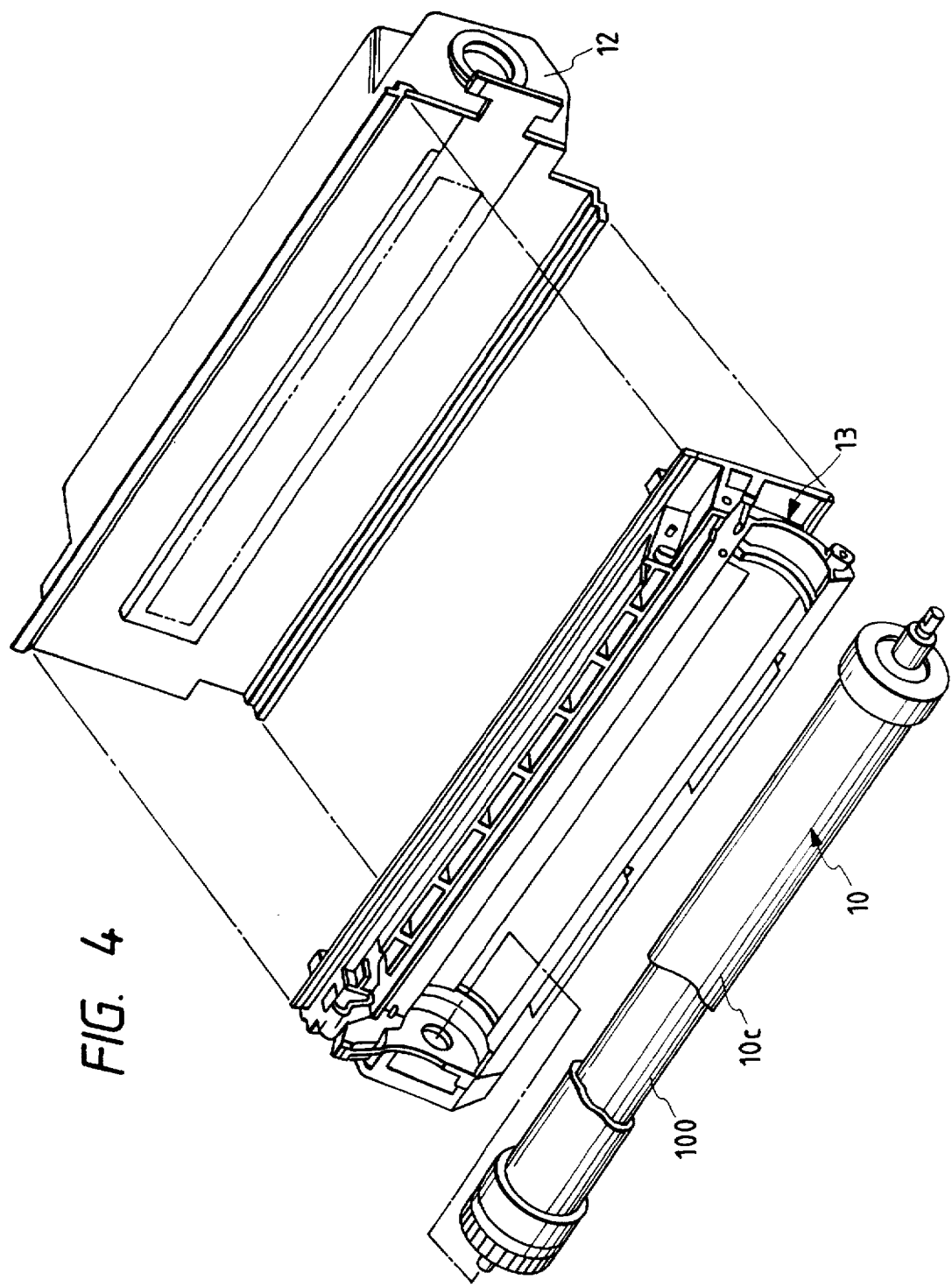
FIG. 4 is a view showing a developing unit in FIG. 1.

The structure of the developing unit according to this embodiment is shown in FIG. 4. The developing unit comprises a developing sleeve unit 10, the developing frame 13, and the toner frame 12.

The developing sleeve unit has a developing sleeve 10c serving as a developing agent carrier and a magnet roll member 100 coaxially held in the developing sleeve 10c. The magnet roll member 100 is normally fixed to the developing frame 13.

(Magnet Roll Member)

Figure 5:
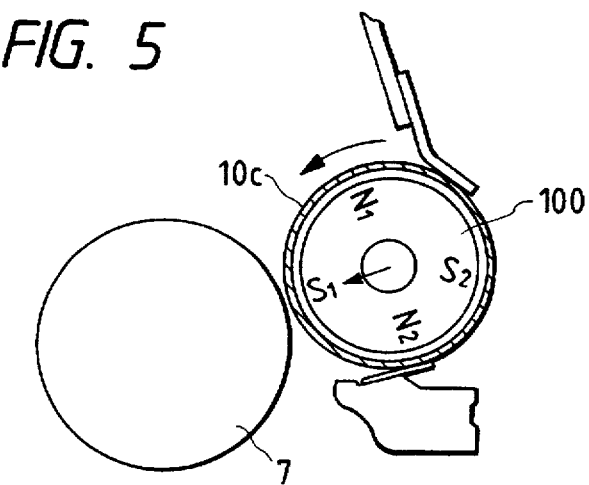
FIG. 5 is a view showing the positional relationship between a photosensitive drum and a magnet roll member along a section perpendicular to the axis of the photosensitive drum in FIG. 1.

FIG. 5 shows the positional relationship between the photosensitive drum 7 and the magnet roll member along a section perpendicular to the axis of the photosensitive drum. The magnet roller member 100 includes a roller portion 100 ais coaxial with the sleeve 10c and fixed in a space. The magnet roll member 100 has four magnetic poles $S_1$, $S_2$, $N_1$, and $N_2$. The magnetic flux density of each magnetic pole is, e.g., 500 to 700 Gauss. When the magnetic pole positions are maintained in the range of ±3°, the main developing pole ($S_1$) can be stabilized in the developing state, and the magnetic pole $S_2$ can be stabilized in toner charge amount.

A method of fixing the magnet roller member will now be described.

Figure 6:
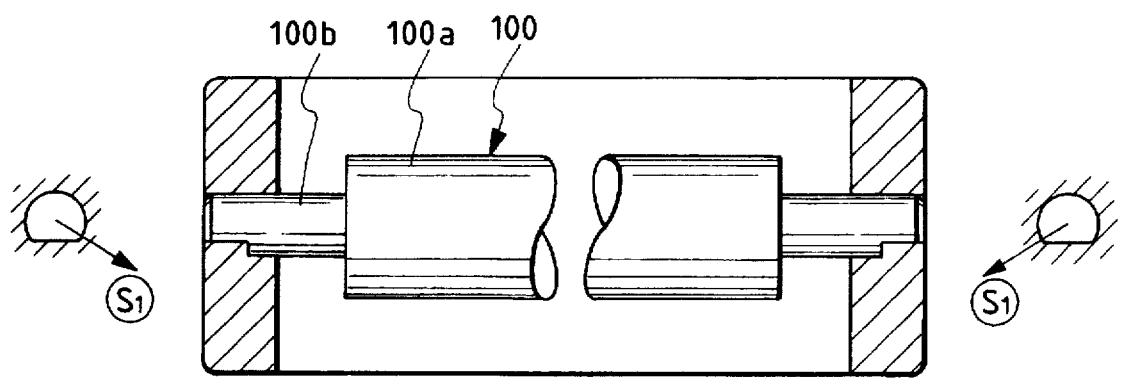
FIG. 6 is a view for fixing the magnetic pole positions of the magnet roll member.

Projection-recess engagement using a D cut shown in FIG. 6 as the background of the present invention will be described below.

The manufacturing process of the magnet roll having the above structure is shown in FIG. 7.

In this manufacturing method, a flat portion 100c for positioning is formed at the shaft end portion of a central shaft 100b of the magnet roll member. The magnet roll member is detached/attached using this flat portion as a reference surface in the rotational direction. A surface which receives the flat portion at the shaft end of the magnet roll is formed in the magnet roll supporting member such that the main pole direction of the magnet roll member is directed toward the central axis of the drum in advance. By fitting or engagement of the flat portion and the surface of the magnet roll supporting member, the angular positions of the magnet roll member and the magnet roll supporting members are determined.

(Method of Adjusting Magnetic Poles of Magnet Roll)

Positioning by D-cut engagement poses a problem of the cumulative errors of the respective separate components. Main errors are an error in attachment/detachment position with respect to the shaft end reference flat portion 100c, an error in the engaging portion between the magnet roll supporting member and the magnet roll member, a mounting error between the magnet roll supporting member and the developing frame, and the like. These cumulative errors undesirably widen the range of the main developing pole of the magnet roll to be ±5° or more in the final assembly even if each separate component is managed within the range of, e.g., ±3°.

In order to solve this problem, a method of adjusting the magnetic pole positions of the magnet roll upon assembly is used in this embodiment.

Figure 8:
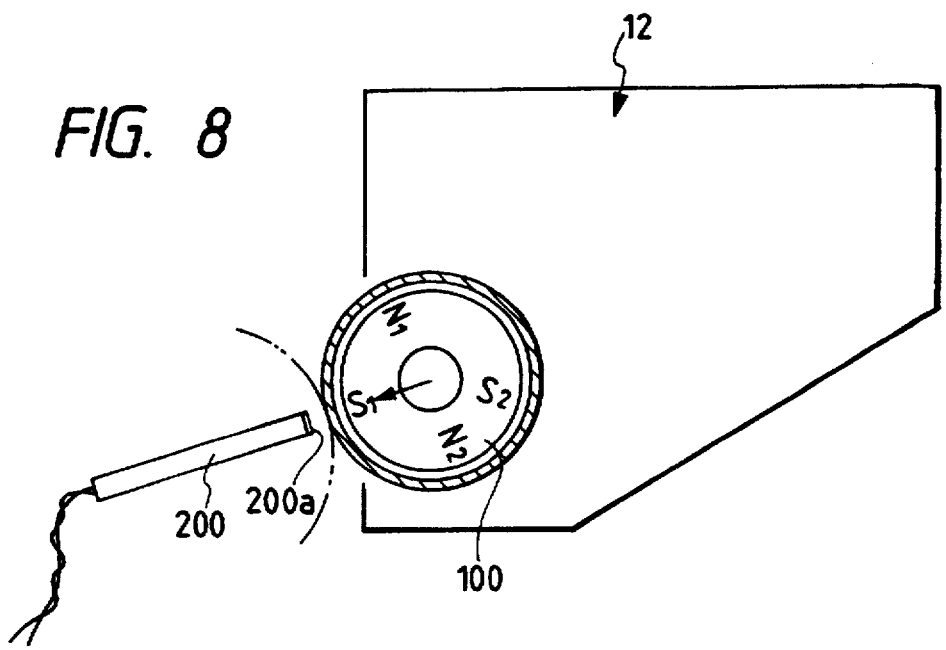
FIG. 8 is a view showing a method of detecting the magnetic pole positions of the magnet roll member.

FIG. 8 shows this adjustment method. Referring to FIG. 8, a developing unit 12 is fixed in a space by the apparatus or the like. In adjustment, the magnet roll 100 is rotatably held with respect to the developing unit 12. A magnetic pole sensor 200 has a Hall element 200a at its distal end. The magnetic pole sensor 200 is fixed on the same apparatus such that the direction of the magnetic flux density is directed toward the center of the drum (i.e., a direction indicated by an arrow). In adjustment, the magnet roll member is rotated while measuring the output value from this magnetic sensor. The main developing direction is determined as a regular position at a position where the peak value of the S pole output is obtained.

(Fixing Method in Magnetic Pole Adjustment Specifications)

Figure 9A:
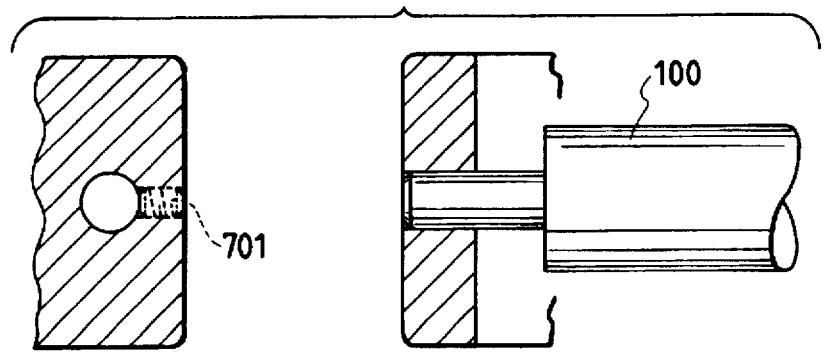
FIGS. 9A and 9B are views, respectively, showing fixing methods for arrangements in which the magnetic pole positions of the magnet roll member are adjustable.
Figure 9B:
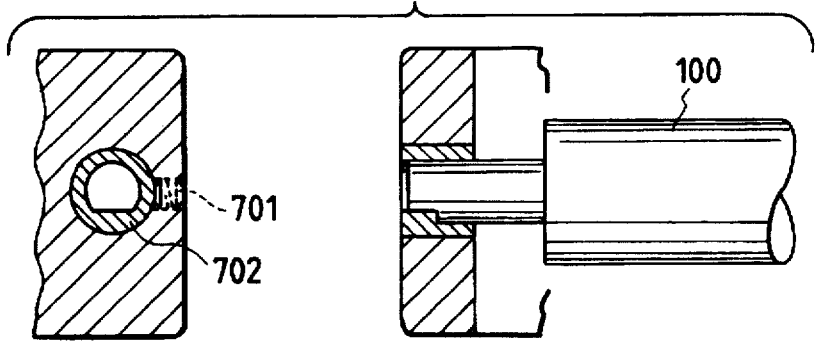

A magnet roll supporting and fixing structure in which the magnetic pole positions of the magnet roll member are adjustable will be described below. As shown in FIG. 9A, the magnet roll shaft is fitted in the hole of the magnet roll supporting member, and the magnet roll member is rotatable with respect to the supporting member until a set screw 701 is tightened. In this structure, the magnetic pole positions are adjusted while the set screw is kept loosened. After the adjustment, the set screw is tightened to fix the magnet roll member. Alternatively, FIG. 9B shows a method of fixing a magnet roll member in a magnet roll supporting member by mounting a collar 702 on the outer surface of the magnet roll shaft. In this structure, D-cut engagement is used as a rotation stopper between the collar and the magnet roll shaft.

The disadvantages of this fixing method are as follows.
(1) Separate members such as a set screw or a collar is required.
(2) Problems are posed in reliability on fixing methods such as a change in angle of the magnet roll during screw tightening and loosening of the screw in long-term use.

A fixing method of this embodiment will be described below.

Figure 10:
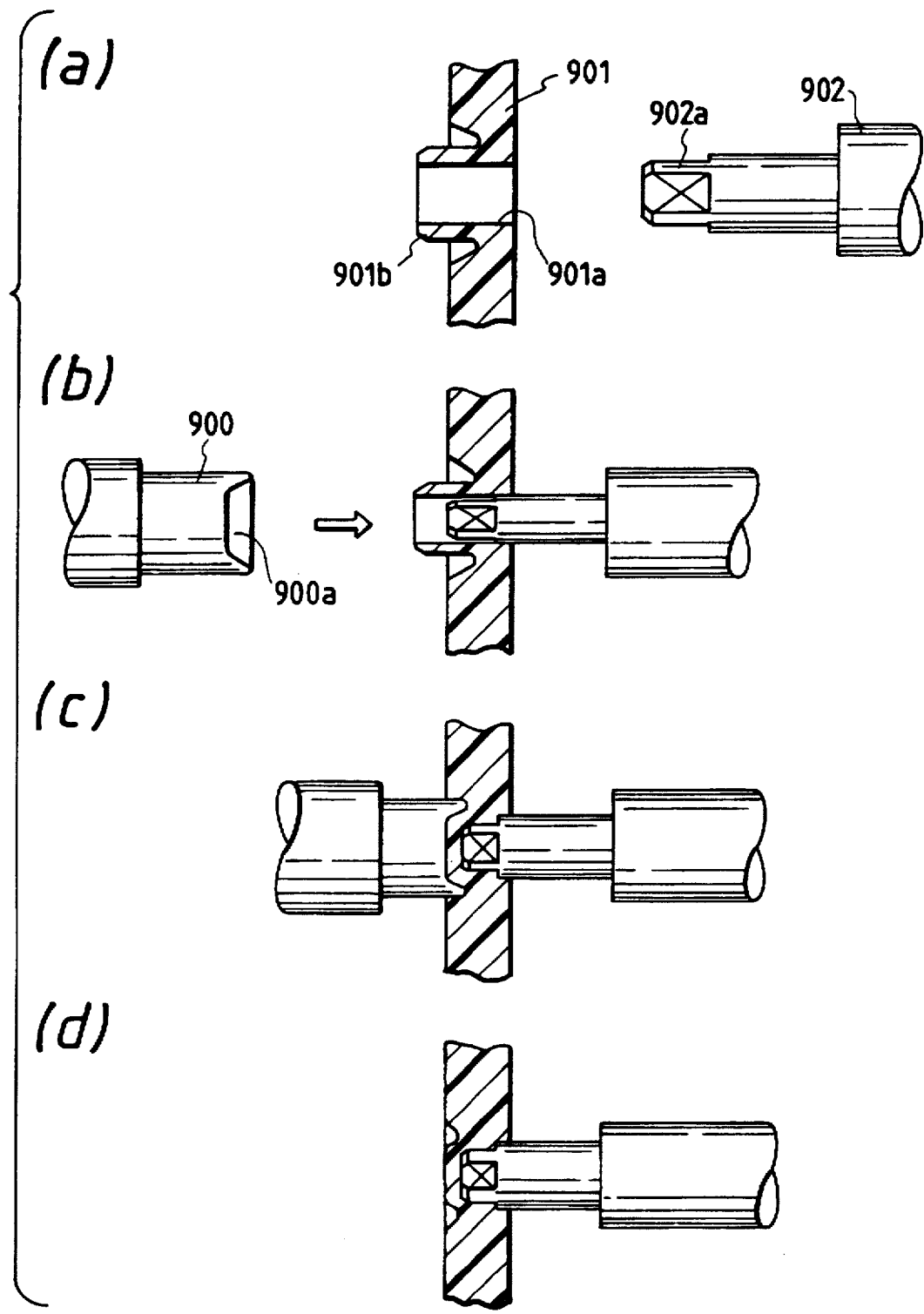
FIG. 10 is a view showing a method of fixing a magnet roller member and a magnet roll supporting member by welding according to an embodiment.

A fixing method using welding will be described as a method of causing the adjusting means to position the main developing pole ($S_1$) of the magnet roll member and then coupling the magnet roll member in a magnet roller supporting member. FIG. 10 is a view showing a coupling method by welding. A flat portion 902a as a rotation stopper is formed at a shaft end portion of a magnet roll member 902. A magnet roll supporting member 901 is preferably made of a material having a melting point lower than that of the shaft portion of the magnet roll member. For example, the magnet roll supporting member 901 is made of a synthetic resin having a melting point lower than that of a material of the shaft portion. The diameter of a hole 901a of the supporting member is managed such that appropriate fitting between the hole of the supporting member and the shaft portion of the magnet roll member is maintained.

In welding, the shaft portion of the magnet roll member is inserted into the hole of the magnet roll supporting member 901 ((b) in FIG. 10) and a welding horn 900 held coaxially with the magnet roll member and the magnet roll supporting member in the welding apparatus is fed in a direction indicated by an arrow while ultrasonically vibrating the welding horn so as to conduct welding as shown in (c) in FIG. 10.

A wall portion 901b for welding in the magnet roll supporting member melts to flow onto the flat portion as a rotation stopper at the distal end of the shaft of the magnet roll member, thereby completing coupling between the magnet roll member and the magnet roll supporting member (d) in FIG. 10.

Since the central portion of the welding horn 900 has a recess 900a which facilitates the flow of the molten material, the molten state is stable, and the outer appearance of the welded portion can be improved.

As the welding energy generating means, heat welding using a heat energy may be used in place of ultrasonic welding using ultrasonic vibrations about the axis of the welding horn.

Figure 11A:
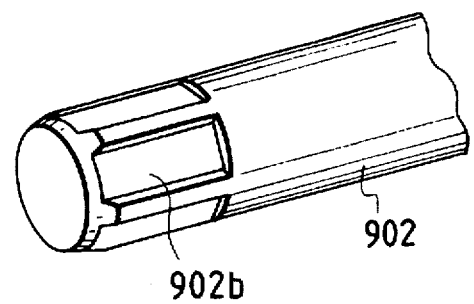
FIGS. 11A, 11B and 11C are views showing the shapes of shaft end portions of magnet roll members according to embodiments of the present invention.
Figure 11B:
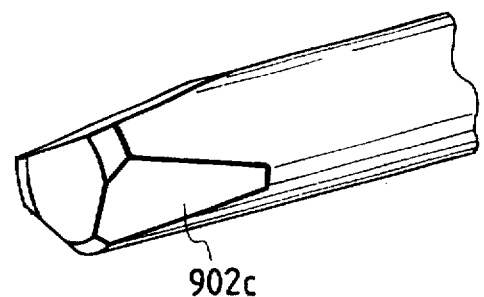
Figure 11C:
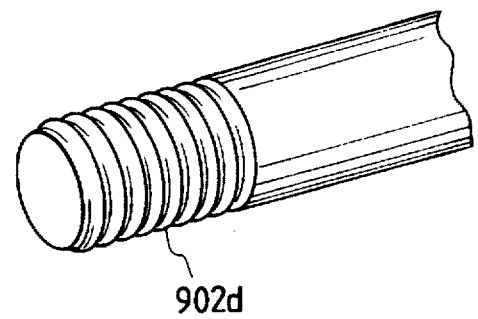

Rotation stopper shapes formed at the shaft end portions of magnet roll members are shown in FIGS. 11A to 11C.

Flat surfaces 902b parallel to the axis of the shaft are formed on the outer surface of the shaft in FIG. 11A. The plurality of flat surfaces 902b are illustrated in FIG. 11A, but one or a plurality of flat surfaces may be formed.

Tapered surfaces 902c directed toward the distal end of the shaft of a magnet roll member and having a given angle with respect to the axis of the magnet roll member are illustrated in FIG. 11B. The plurality of tapered surfaces 902c are illustrated, but one or a plurality of tapered surfaces may be formed.

An external thread 902d or a plurality of grooves may be formed on the outer surface of the shaft end of a magnet roll member, as shown in FIG. 11C. As in the shapes of the two shaft ends shown in FIGS. 11A and 11B, the magnet roll supporting member melts to flow into the recessed portions on the outer surface of the shaft to prevent rotation of the magnet roll member and the magnet roll supporting member. The shape of the shaft end may be constituted by a plurality of grooves in the axial direction (e.g., knurl serration or spline grooves).

The shape of the hole of the magnet roll supporting member into which the magnet roll member is fitted is shown in FIG. 10. As indicated by 901b, an extra wall is formed as a portion to be welded to result in a good outer appearance. If a good outer appearance is not required, the extra wall need not be formed.

The present invention has been described with reference to the particular embodiments described above. However, the present invention is not limited to these embodiments, but can be modified within the spirit and scope of the invention.

What is claimed is:

1. A method of assembling a developing unit, comprising the steps of:

preparing a magnet roll having a central shaft;

adjusting a position of said magnet roll with respect to a magnet roll supporting member essentially consisted of a synthetic resin having a melting point lower than a material of the central shaft; and melting a portion of said supporting member to weld and fix the central shaft and said supporting member.

2. A method according to claim 1, wherein said supporting member has an insertion hole in which the central shaft is to be inserted, and the melted portion of said supporting member flows in the insertion hole to weld and fix the central shaft.

3. A method according to claim 2, wherein the central shaft has a cut surface or a groove at an end portion thereof, and the melted portion of said supporting member flows in the cut surface or the groove.

4. A method according to claim 1, wherein said supporting member and said magnet roll are coupled to each other by ultrasonic vibration welding.

5. A method according to claim 1, wherein said supporting member and said magnet roll are coupled to each other by heat welding.

6. A developing device comprising:

a developing agent carrying member for carrying a developing agent;

a magnet roll having a central shaft disposed in said developing agent carrying member; and a supporting member or supporting said magnet roll essentially consisted of a synthetic resin having a melting point lower than a material of the central shaft, wherein a portion of said supporting member is melted to weld and fix the central shaft and said supporting member.

7. A device according to claim 6, wherein said supporting member has an insertion hole in which the central shaft is to be inserted, and the melted portion of said supporting member flows in the insertion hole to weld and fix the central shaft.

8. A device according to claim 7, wherein the central shaft has a cut surface or a groove at an end portion thereof, and the melted portion of said supporting member flows in the cut surface or the groove.

9. A device according to claim 6, wherein said supporting member and said magnet roll are coupled to each other by ultrasonic vibration welding.

10. A device according to claim 6, wherein said supporting member and said magnet roll are coupled to each other by heat welding.

11. A device according to claim 6, wherein said developing device constitutes an integral cartridge structure together with an image carrying member for carrying an electrostatic latent image.

* * * * *

UNITED STATES PATENT AND TRADEMARK OFFICE
CERTIFICATE OF CORRECTION

PATENT NO. : 5,768,669

DATED : June 16, 1998

INVENTOR(S) : KATSUNORI YOKOYAMA

It is certified that error appears in the above-identified patent and that said Letters Patent is hereby corrected as shown below:

COLUMN 3

Line 20, "12" should read --1a--.

COLUMN 5

Line 13, "100" (second occurrence) should read --100a,--.
Line 14, "ais" should read --is--.

Signed and Sealed this

Fourteenth Day of November, 2000

Attest:

Q. TODD DICKINSON

*Attesting Officer*    *Director of Patents and Trademarks*

UNITED STATES PATENT AND TRADEMARK OFFICE
CERTIFICATE OF CORRECTION

PATENT NO. : 5,768,669
DATED : June 16, 1998
INVENTOR(S) : Katsunori Yokoyama

It is certified that error appears in the above-identified patent and that said Letters Patent is hereby corrected as shown below:

Title page,
Item [73], Assignee, "Canon Kabushiki Kaisha, Japan" should read -- Canon Kabushiki Kaisha, Tokyo, Japan. --

Signed and Sealed this

Nineteenth Day of February, 2002

Attest:

JAMES E. ROGAN
*Attesting Officer*     *Director of the United States Patent and Trademark Office*